Feb. 3, 1925.  
S. S. POTTER  
1,524,997  
TREAD OR SOLE AND HEEL FOR BOOTS AND SHOES  
Filed Jan. 16, 1924
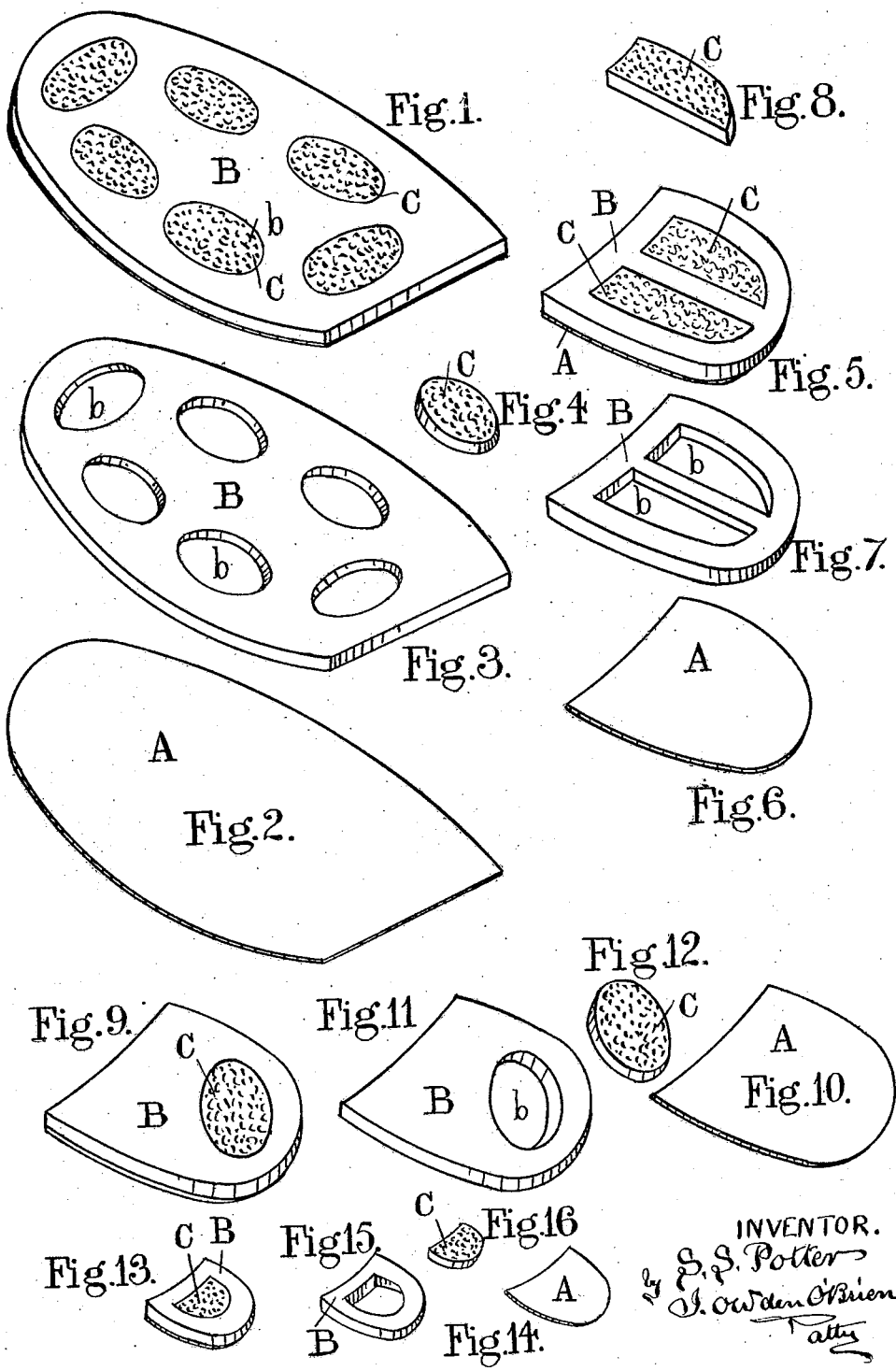

Patented Feb. 3, 1925.

1,524,997

UNITED STATES PATENT OFFICE.

SYDNEY SMITH POTTER, OF MANCHESTER, ENGLAND, ASSIGNOR TO ANNIE HARRISON, OF BLACKPOOL, ENGLAND.

TREAD OR SOLE AND HEEL FOR BOOTS AND SHOES.

Application filed January 16, 1924. Serial No. 686,619.

*To all whom it may concern:*

Be it known that I, SYDNEY SMITH POTTER, a British subject, residing at Manchester, county of Lancaster, England, have invented certain new and useful Improvements in Treads or Soles and Heels for Boots and Shoes, of which the following is a specification.

This invention relates to treads or soles and heels for boots and shoes and is designed to utilize therefor crêpe or uncured natural rubber.

According to the invention the tread sole or heel is built up from a thin sheet or layer of crêpe of natural uncured rubber, a skeleton layer of leather or other material and one or more separate replaceable pieces of crêpe rubber fitted into the opening or openings in the skeleton layer, and solutioned to the layer of crêpe rubber beneath.

The invention will be fully described with reference to the accompanying drawings.

Fig. 1, is a perspective view of sole constructed according to the invention.

Fig 2, is a perspective view of sheet or layer of thin crêpe rubber A stamped to shape.

Fig. 3, is a perspective view of skeleton layer of leather B.

Fig. 4, is a perspective view of one of the additional separate replaceable pieces of crêpe rubber C.

Figs. 5, 9 and 13, are perspective views of heels constructed according to the invention.

Figs. 6, 10, 14, are perspective views of sheets or layers of thin crêpe rubber A stamped to shape.

Figs. 7, 11, 15 are perspective views of skeleton layer of leather B.

Figs. 8, 12, 16, are perspective views of one of the separate replaceable pieces of crêpe rubber C.

The tread is constructed or built up of two separate layers (*a*) a layer A of thin crêpe or natural uncured rubber (*b*) a skeleton layer B of leather (or other material) and (*c*) one or more separate replaceable pieces C of crêpe or natural uncured rubber.

The first layer A of crêpe or natural uncured rubber is stamped to the desired shape for sole or heel from a sheet of crêpe or uncured rubber, and is preferably as thin as possible.

The second skeleton layer B of leather is stamped to the contour of the sole or heel around its outer edge with one or more openings or apertures *b* of any desired size or shape cut or stamped out of the body. The leather layer B may be thin or thick as desired.

The additional separate replaceable piece or pieces C of crêpe rubber are stamped from a sheet to correspond with the size and shape of the aperture or apertures *b* in the skeleton layer B of leather. The openings or apertures *b* are preferably bevelled or tapered to assist in holding the pieces C in position. Where a sole is formed with only one aperture to receive a single replaceable piece C the latter may be of any convenient shape and may be of such size that it covers the sole except for a margin of leather around. The width of such margin may vary as desired.

The thin sheet or layer A of crêpe rubber is attached to the back of the skeleton layer B by a rubber solvent or solution, the crêpe rubber A being uncovered on the face where the apertures *b* occur. The additional separate replaceable piece or pieces C of crêpe rubber are placed in the apertures *b* and attached to the sheet or layer A of crêpe rubber below by rubber solution or solvent. The separate replaceable piece or pieces C may be of a thickness to be level with the face of the skeleton layer B of leather or may be of such a thickness as to stand out above the surface of the leather.

The sole or heel is permanently affixed to the boot or shoe by stitches or pegs through the leather B and when worn down the additional replaceable piece or pieces C of crêpe rubber can be renewed by affixing a fresh piece or fresh pieces of crêpe rubber of similar shape in the apertures *b* by a rubber solution or solvent to the crêpe.

What I claim as my invention and desire to protect by Letters Patent is:—

1. A tread for boots and shoes constructed or built up in combination of a sheet of natural uncured rubber stamped to shape, a skeleton layer of leather with an aperture therein, and a separate replaceable piece of crêpe rubber fitted into the aperture in the leather substantially as described.

2. A tread for boots and shoes constructed or built up in combination of a sheet of natural uncured rubber stamped to shape, a skeleton layer of leather with a plurality of apertures therein, and a plurality of separate replaceable pieces of crêpe rubber fitted into the apertures in the leather substantially as described.

In testimony whereof I have hereunto set my hand in presence of two subscribing witnesses this 5th day of January, 1924.

SYDNEY SMITH POTTER.

Witnesses:
 I. OWDEN O'BRIEN.
 GEO. H. O'BRIEN.